(12) United States Patent
Nanko et al.

(10) Patent No.: US 6,769,034 B1
(45) Date of Patent: Jul. 27, 2004

(54) VIRTUAL AV NETWORK BUILDING DEVICE, VIRTUAL AV NETWORK BUILDING METHOD, AND RECORDED MEDIUM ON WHICH PROGRAM CONCERNING VIRTUAL AV NETWORK BUILDING METHOD IS RECORDED

(75) Inventors: Takahiko Nanko, Hyogo (JP);
Yoshifumi Yanagawa, Kyoto (JP);
Hiroyuki Iitsuka, Osaka (JP);
Masazumi Yamada, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/744,078

(22) PCT Filed: May 18, 2000

(86) PCT No.: PCT/JP00/03173

§ 371 (c)(1),
(2), (4) Date: Mar. 20, 2001

(87) PCT Pub. No.: WO00/72161

PCT Pub. Date: Nov. 30, 2000

(30) Foreign Application Priority Data

May 19, 1999 (JP) .......................................... 11-138940

(51) Int. Cl.[7] .............................................. G06F 3/00
(52) U.S. Cl. ........................... 710/11; 710/18; 710/62; 710/70; 710/72; 710/300; 710/305; 710/313
(58) Field of Search ............................. 710/11, 18, 300, 710/305, 70, 72, 313, 62

(56) References Cited

U.S. PATENT DOCUMENTS 6,199,136 B1 * 3/2001 Shteyn ....................... 710/305
6,298,370 B1 * 10/2001 Tang et al. .................. 709/102
6,327,637 B1 * 12/2001 Chang ........................ 700/305
6,349,352 B1 * 2/2002 Lea .............................. 710/72
6,532,019 B1 * 3/2003 Gulick et al. ............... 345/519
6,549,929 B1 * 4/2003 Sullivan ..................... 709/102
6,591,419 B2 * 7/2003 Barry et al. .................. 725/25
6,611,537 B1 * 8/2003 Edens et al. ................ 370/503

FOREIGN PATENT DOCUMENTS

| DE | 19835668 | 2/1999 |
|---|---|---|
| EP | 864984 | 9/1998 |
| EP | 875837 | 11/1998 |
| JP | 10-145420 | 5/1998 |
| JP | 10-254811 | 9/1998 |
| JP | 11-27299 | 1/1999 |
| JP | 11-31118 | 2/1999 |
| JP | 11-68884 | 3/1999 |
| JP | 11-73418 | 3/1999 |
| WO | 9737202 | 10/1997 |

* cited by examiner

Primary Examiner—Jeffrey Gaffin
Assistant Examiner—Niketa I. Patel
(74) Attorney, Agent, or Firm—Wenderoth, Lind & Ponack, L.L.P.

(57) ABSTRACT

The present invention relates to an AV network construction apparatus A, comprising: a 1394 link 10 for connecting lines employing an interface of IEEE1394 standard, an information receiving/transmitting means 11, a protocol processing means 12, a virtual device function processing means 20, an integration management means 30 for activating or terminating the virtual device function processing means 20, an OS 40 for activating a pc 103, and a PC device driver 50 for activating a peripheral device M, and a method for constructing such a virtual AV network construction, and a recording medium containing a program concerning the virtual AV network construction method.

36 Claims, 4 Drawing Sheets

VIRTUAL AV NETWORK BUILDING DEVICE, VIRTUAL AV NETWORK BUILDING METHOD, AND RECORDED MEDIUM ON WHICH PROGRAM CONCERNING VIRTUAL AV NETWORK BUILDING METHOD IS RECORDED

TECHNICAL FIELD

The present invention relates to an apparatus for constructing newly a virtual AV network which, in case when peripheral devices such as a printer are connected to a node of the AV network which is constructed by that devices dealing with video data, sound data, information data, or the like are connected, can give an appearance as if the whole used a single interface even when respective peripheral devices utilizes interfaces different from that used by the AV network, and a method for constructing such a virtual AV network construction, and a recording medium containing a program concerning the virtual AV network construction method.

BACKGROUND ART

In recent years, an AV system, which has enabled performing control of devices by displaying graphics or icons, which are composed of screen-display data or characters showing functions of devices, on a screen of a television receiver (hereinafter, described as "TV") or a monitor of a personal computer (hereinafter, described as "PC"), and seeing what is displayed, and operating a remote-control device to select a desired function though the remote control of the TV or the like, has started to appear. Amongst the above, concern about an AV network in which digital devices such as DVC are connected by video/audio reception/transmission data lines, employing serial buses being an interface of IEEE(Institute of Electrician and Electronic Engineers)1394 standard are growing these days. It can be thought that it is because respective AV devices constructing an AV network are given equal opportunities for communicating with other AV devices periodically by a bi-directional packet communication method without performing connection switching, thereby the communication between devices is eased.

Owing to the above-described advantages, while devices which can be used in the AV network employing IEEE1394 standard have recently been announced, at this moment, devices employing various sorts of interfaces other than that of IEEE1394 standard already exist and are put into practical use. Particularly, devices such as a digital still camera (hereinafter, described as "DSC") employing RS-232C standard, a printer employing Centronics standard, a scanner employing USB standard, an optical disk employing SCSI standard, a CD-ROM (Compact Disk—Read Only Memory), a digital versatile disk (DVD) employing IDE standard, and the like have already been used under various forms by many users.

However, in case of constructing a new AV network employing a set-top-box (hereinafter described as "STB") or a AV/C controller, or the like which use the interface of IEEE 1394 standard is constructed, even when if it is attempted to use the conventional DSC, scanner, or printer by connecting the same through a PC functioning as a node of this AV network, no compatibility between various interfaces employed in the devices connected to the PC, as well as, of course, even no compatibility with IEEE1394 standard, resulting in no unified interface in this AV network.

In other words, there is a problem that while it is easy to receive and transmit data or a command between devices using IEEE1394, even when data or command is attempted to be transmitted or received between the device using IEEE1394 and the device connected to the PC, the transmission/reception is impossible difference in the interfaces of these devices.

Further, though it is possible to obtain the above-described effect by constructing the AV network employing only the devices of IEEE1394 standard, this construction requires to replace all the devices used by devices which meet IEEE1394 standard, thereby resulting in a high cost in expenses as well as the conventional devices have to be thrown away.

The present invention is made to solve the above described problems, and has for its object to provide an apparatus and a method for virtual AV network construction, and a recording medium containing a program concerning the virtual AV network construction method, which can give an appearance as if the AV network were virtually constructed employing a single interface even when the AV network is constructed employing various devices using diverse existing interfaces.

DISCLOSURE OF THE INVENTION

To solve the above-mentioned problems, according to a first aspect of the present invention, there is provided a virtual AV network construction apparatus which, when, one or more peripheral devices which have different interfaces from the interface employed by the AV network are connected to a node which is connected to an AV network which is constructed by that plural devices are connected via data reception/transmission lines, constructs a virtual AV network which looks as if employing a single interface as a whole by performing processing as if the interface of the peripheral device were of the same kind as the interface employed in the AV network, comprising :said devices and said peripheral devices being ones which deal with one or more data of video data, sound data, or information data: virtual device function processing means for enabling reception/transmission of data or command between the devices and the peripheral devices connected to the virtual AV network, by performing control processing mutually between the interfaces of the peripheral devices and the interface of the AV network, so as to construct the virtual AV network; and integration management means for activating or terminating the virtual device function processing means corresponding to the peripheral devices following peripheral device construction information as construction information of the peripheral devices.

Therefore, by employing the virtual AV network construction apparatus, it is possible to construct an AV network virtually without difficulty even between devices of different interfaces, and to give an appearance as if the unified interfaces were used in the virtual AV network, thereby enabling performing reception/transmission of data or command independently of interfaces of peripheral devices. It is thus possible to smooth the reception/transmission of data or command between devices constructing the AV network, and devices currently in use can also be applied as they are without employing special processings.

According to a second aspect of the present invention, in the virtual AV network construction apparatus of the first aspect, the integration management means performs activation or termination of the virtual device function processing means automatically in accordance with insertion or ejection of the peripheral devices connected to the node.

Therefore, it is not required to confirm the activation of the virtual device function processing means every time the peripheral devices are inserted/ejected, thereby removing complexity of operations.

According to a third aspect of the present invention, in the virtual AV network construction apparatus of the first or second aspect, the integration management means is provided with sub-unit destinated processing means for enabling giving an appearance as if a function of the peripheral device is present inside the node, by the integration management means performing reception/transmission of data or command from the AV network to d sub-unit which is included in the virtual device function processing means and operates as a function of the peripheral device.

Therefore, with providing a sub-unit destinated processing means which enables giving an appearance as if a function of the peripheral devices were present inside the node, routing of data or command is eased.

According to a fourth aspect of the present invention, the virtual AV network construction apparatus of any of the first to third aspects includes: data command path management means for enabling giving an appearance as if reception/transmission of data or command by the interface employed by the AV network were virtually executed between the plural peripheral devices, by the integration management means performing reception/transmission of data or command from/to the virtual device function processing means corresponding to the respective plural peripheral devices when an instruction to perform reception/transmission of data or command between the plural peripheral devices is given to the virtual AV network by the interface employed by the AV network in case where the plural peripheral devices are connected to the node.

Therefore, reception/transmission of data or command between the peripheral devices through the virtual AV network construction apparatus can be easily realized independently of the interfaces.

According to a fifth aspect or the present invention, in the virtual AV network construction apparatus of any of the first to fourth aspects, the virtual device function processing means is provided with data format conversion means for selecting a method to convert a format of the interface employed by the peripheral device into a format of the interface employed by the AV network following a data format used by the peripheral device connected to the node.

Therefore, respective devices can behave as if performing reception/transmission of data following the unified interface in the virtual AV network constructed by this virtual AV network construction apparatus.

According to a sixth aspect of the present invention, in the virtual AV network construction apparatus of any of the first to fifth aspects, the virtual device function processing means is provided with command translating means for translating a command by the format employed by the AV network into a command by the format employed by the peripheral device.

Therefore, respective devices can behave as if performing reception/transmission of command following the unified interfaces in the virtual AV network constructed by the virtual AV network construction apparatus.

According to a seventh aspect of the present invention, in the virtual AV network construction apparatus of any of the first to sixth aspects, the format employed by the AV network is that employed in so-called IEEE (Institute of Electrician and Electronic Engineers) 1394.

Therefore, it is possible to use various kinds of digital devices, which have recently started to appear.

According to an eighth aspect of the present invention, in the virtual AV network construction apparatus of any of the first to seventh aspects, a computer is used as the node, and the integration management means and the virtual device function processing means are controlled by employing an operating system of the computer.

Therefore, by using computers which are widespread these days, anyone can construct the virtual AV network according to the present invention.

According to a ninth aspect of the present invention, in the virtual AV network construction apparatus of any of the first to eighth aspects, the peripheral device construction information is obtained from the peripheral device construction information held by the operating system.

Therefore, by connecting the peripheral devices to a computer, and using the computer as a node of the virtual AV network, it is easily possible to manage the peripheral device construction information.

According to a tenth aspect of the present invention, in the virtual AV network construction apparatus of the eighth or ninth aspect, the control of the peripheral devices locally connected to the computer is performed by a device driver software of the operating system, and the virtual device function processing means performs reception/transmission of command or data from/to the device driver software corresponding to the peripheral device which performing the control processing.

Therefore, it is possible that the computer manages the virtual AV network.

According to an eleventh aspect of the present invention, there is provided a virtual AV network construction method which, when one or more peripheral devices which have different interfaces from the interface employed by the AV network are connected to a node which is connected to an AV network which is constructed by that plural devices are connected via data reception/transmission lines, constructs a virtual AV network which looks as if employing a single interface as a whole by performing processing as if the interface of the peripheral device were of the same kind as the interface employed in the AV network, wherein said devices and said peripheral devices are ones which deal with one or more data of video data, sound data, or information data, comprises at least: virtual device function processing step of enabling reception/transmission of data or command between the devices and the peripheral devices connected to the virtual AV network, by performing control processing mutually between the interfaces of the peripheral devices and the interface of the AV network, so as to construct the virtual AV network; and integration management step of activating or terminating the virtual device function processing step for the corresponding to the peripheral device following peripheral device construction information as construction information of the peripheral device.

Therefore, by employing the virtual AV network construction apparatus, it is possible to construct an AV network virtually without difficulty even between devices of different interfaces, and to give an appearance as if the unified interfaces were used in the virtual AV network, thereby enabling performing reception/transmission of data or command independently of interfaces of peripheral devices. It is thus possible to smooth the reception/transmission of data or command between devices constructing the AV network, and devices currently in use can also be applied as they are without employing special processings.

According to a twelfth aspect of the present invention, in the virtual AV network construction method of the eleventh aspect, the integration management step activates or terminates the virtual device function processing step automatically in accordance with insertion or ejection of the peripheral devices connected to the node.

Therefore, it is not required to confirm the activation of the virtual device function processing means every time the peripheral devices are inserted/ejected, thereby removing complexity of operations.

According to a thirteenth aspect of the present invention, in the virtual AV network construction method of the eleventh or twelfth aspect, the integration management step is provided with sub-unit function processing destinated processing step of enabling giving an appearance as if a function of the peripheral device is present inside the node, by the integration management step performing reception/transmission of data or command from the AV network to a sub-unit function processing step which is included in the virtual device function processing step and operates as a function of the peripheral device.

Therefore, with providing a sub-unit destinated processing means which enables giving an appearance as if a function of the peripheral devices were present inside the node, routing of data or command is eased.

According to a fourteenth aspect of the present invention, the virtual AV network construction method of any of the eleventh to thirteenth aspects includes: data command path management step of enabling giving an appearance as if reception/transmission of data or command by the interface employed by the AV network were virtually executed between the plural peripheral devices, by the integration management step performing reception/transmission of data or command from/to the virtual device function processing step corresponding to the respective plural peripheral devices when an instruction to perform reception/transmission of data or command between the plural peripheral devices is given to the virtual AV network by the interface employed by the AV network in case where the plural peripheral devices are connected to the node.

Therefore, reception/transmission of data or command between the peripheral devices through the virtual AV network construction apparatus can be easily realized independently of the interfaces.

According to a fifteenth aspect of the present invention, in the virtual AV network construction method of any of the eleventh to fourteenth aspects, the virtual device function processing step is provided with data format conversion step of selecting a method to convert a format of the interface employed by the peripheral device into a format of the interface employed by the AV network following a data format used by the peripheral device connected to the node.

Therefore, respective devices can behave as if performing reception/transmission of data following the unified interface in the virtual AV network constructed by this virtual AV network construction apparatus.

According to a sixteenth aspect of the present invention, in the virtual AV network construction method as described in any of the eleventh to fifteenth aspects, the virtual device function processing step is provided with command translating step of translating a command by the format employed by the AV network into a command by the format employed by the peripheral device.

Therefore, respective devices can behave as if performing reception/transmission of command following the unified interfaces in the virtual AV network constructed by the virtual AV network construction apparatus.

According to a seventeenth aspect of the present invention, in the virtual AV network construction method of any of the eleventh to sixteenth aspects, the format employed by the AV network is that employed for so-called IEEE (Institute of Electrician and Electronic Engineers) 1394.

Therefore, it is possible to use various kinds of digital devices, which have recently started to appear.

According to an eighteenth aspect of the present invention, in the virtual AV network construction method of any of the eleventh to seventeenth aspects, a computer is used as the node, and the integration management step and the virtual device function processing step are controlled by employing an operating system of the computer.

Therefore, by using computers which are widespread these days, anyone can construct the virtual AV network according to the present invention.

According to a nineteenth aspect of the present invention, in the virtual AV network construction method of the eighteenth aspect, the peripheral device construction information is obtained from the peripheral device construction information held by the operating system.

Therefore, by connecting the peripheral devices to a computer, and using the computer as a node of the virtual AV network, it is easily possible to manage the peripheral device construction information.

According to a twentieth aspect of the present invention, in the virtual AV network construction method of the eighteenth or nineteenth aspect, the control of the peripheral devices locally connected to the computer is performed by a device driver software of the operating system, and the virtual device function processing step preforms reception/transmission of command or data from/to the device driver software corresponding to the peripheral device performing the control processing.

Therefore, it is possible that the computer manages the virtual AV network.

According to a twenty-first aspect of the present invention, there is provided a recording medium containing a program concerning a virtual AV network construction method which, when one or more peripheral devices which have different interfaces from the interface employed by the AV network are connected to a node which is connected to an AV network which is constructed by that plural devices are connected via data reception/transmission lines, constructs a virtual AV network which looks as if employing a single interface as a whole by performing processing as if the interface of the peripheral device were of the same kind as the interface employee in the AV network, wherein said devices and said peripheral devices are ones which deal with one or more data of video data, sound data, or information data, comprises at least: virtual device function processing step of enabling reception/transmission of data or command between the devices and the peripheral devices connected to the virtual AV network, by performing control processing mutually between the interfaces of the peripheral devices and the interface of the AV network, so as to construct the virtual AV network; and integration management step of activating or terminating the virtual device function processing step for the corresponding to the peripheral device following peripheral device construction information as construction information of the peripheral device.

Therefore, by employing the virtual AV network construction apparatus, it is possible to construct an AV network virtually without difficulty even between devices of different interfaces, and to give an appearance as if the unified interfaces were used in the virtual AV network, thereby enabling performing reception/transmission of data or command independently of interfaces of peripheral devices. It is thus possible to smooth the reception/transmission of data or command between devices constructing the AV network, and devices currently in use can also be applied as they are without employing special processings.

According to a twenty-second aspect of the present invention, in the recording medium containing a program concerning a virtual AV network construction method of the twenty-first aspect, the integration management activates or terminates the virtual device function processing step automatically in accordance with insertion or ejection of the peripheral devices connected to the node.

Therefore, it is not required to confirm the activation of the virtual device function processing means every time the peripheral devices are inserted/ejected, thereby removing complexity of operations.

According to a twenty-third aspect of the present invention, in the recording medium containing a program concerning a virtual AV network construction method of the twenty-first or twenty-second aspect, the integration management step is provided with sub-unit function processing destinated processing step of enabling giving an appearance as if a function of the peripheral device is present inside the node, by the integration management step performing reception/transmission of data or command from the AV network to a sub-unit function processing step which is include in the virtual device function processing step and operates as a function of the peripheral device.

Therefore, with providing a sub-unit destinated processing means which enables giving an appearance as if a function of the peripheral devices were present inside the node, routing of data or command is eased.

According to a twenty-fourth aspect of the present invention, the recording medium containing a program concerning a virtual AV network construction method of any of the twenty-first to twenty-third aspects includes: data command path management step of enabling giving an appearance as if reception/transmission of data or command by the interface employed by the AV network were virtually executed between the plural peripheral devices, by the integration management step performing reception/transmission of data or command from/to the virtual device function processing step corresponding to the respective plural peripheral devices when an instruction to perform reception/transmission of data or command between the plural peripheral devices is given to the virtual AV network by the interface employed by the AV network in case where the plural peripheral devices are connected to the node.

Therefore, reception/transmission of data or command between the peripheral devices through the virtual AV network construction apparatus can be easily realized independently of the interfaces.

According to a twenty-fifth aspect of the present invention, in the recording medium containing a program concerning a virtual AV network construction method of any of the twenty-first to twenty-fourth aspects, the virtual device function processing step is provided with data format conversion step of selecting a method to convert a format of the interface employed by the peripheral device into a format of the interface employed by the AV network following a data format used by the peripheral device connected to the node.

Therefore, respective devices can behave as if performing reception/transmission of data following the unified interface in the virtual AV network constructed by this virtual AV network construction apparatus.

According to a twenty-sixth aspect of the present invention, in the recording medium containing a program concerning a virtual AV network construction method of any of the twenty-first to twenty-fifth aspects, the virtual device function processing step is provided with command translating step of translating a command by the format employed by the AV network into a command by the format employed by the peripheral device.

Therefore, respective devices can behave as if performing reception/transmission of command following the unified interfaces in the virtual AV network constructed by the virtual AV network construction apparatus.

According to a twenty-seventh aspect of the present invention, in the recording medium containing a program concerning a virtual AV network construction method of any of the twenty-first to twenty-sixth aspects, the format employed by the AV network is that employed for so-called IEEE (Institute of Electrician and Electronic Engineers) 1394.

Therefore, it is possible to use various kinds of digital devices, which have recently started to appear.

According to a twenty-eighth aspect of the present invention, in the recording medium containing a program concerning a virtual AV network construction method of any of the twenty-first to twenty-seventh aspects, a computer is used as the node, and the integration management step and the virtual device function processing step are controlled by employing an operating system of the computer.

Therefore, by using computers which are widespread these days, anyone can construct the virtual AV network according to the present invention.

According to a twenty-ninth aspect of the present invention, in the recording medium containing a program concerning a virtual AV network construction method of the twenty-eighth aspect, the peripheral device construction information is obtained from the peripheral device construction information held by the operating system.

Therefore, by connecting the peripheral devices to a computer, and using the computer as a node of the virtual AV network, it is easily possible to manage the peripheral device construction information.

According to a thirtieth aspect of the present invention, in the recording medium containing a program concerning a virtual AV network construction method of the twenty-eighth or twenty-ninth aspect, the control of the peripheral devices locally connected to the computer is performed by a device driver software of the operating system, and the virtual device function processing step performs reception/transmission of command or data from/to the device driver software corresponding to the peripheral device performing the control processing.

Therefore, it is possible that the computer manages the virtual AV network.

BEST MODE TO EXECUTE THE INVENTION

Hereinafter, an embodiment of an apparatus and a method for virtual AV network construction, and a recording medium containing a program concerning the virtual AV network construction method according to the present invention will be described with reference to figures sequentially. Further, the embodiment described here is only an example and not necessarily restricted to this one.

An example of the AV network employing an interface of IEEE1394 standard, which is a basis for constructing the virtual AV network, will be shown in FIG. 2. in the figure, 100 denotes the AV network employing the interface of IEEE1394 standard, 101 denotes a TV, 102 denotes a remote-control device of the TV, 103 denotes a PC, 104 denotes a recordable and reproducible DVD, 105 denotes a digital VTR (hereinafter, described as "DVC") of the digital video method (hereinafter, described as "DV method"), 106 denotes a digital VTR (hereinafter, described as "DVHS") of the D-VHS method, 107 denotes a digital movie (hereinafter, described as "DVC movie") of the DV method, and 108 denotes a Set-Top-Box (hereinafter, described as "STB") for CS digital broadcasting or the like. These devices are connected by a line 110.

Figure 1:
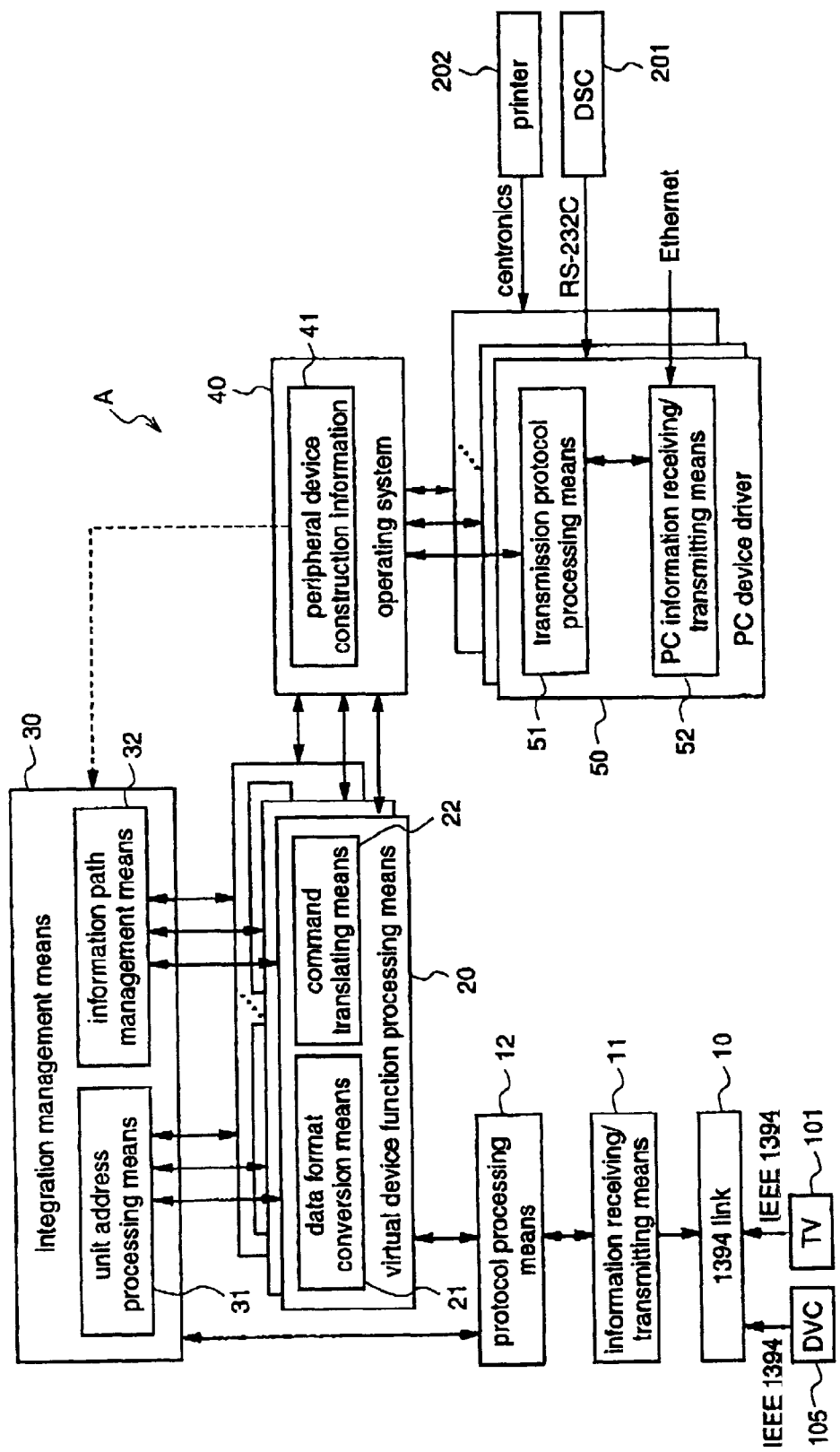
FIG. 1 is a block diagram illustrating a virtual AV network construction apparatus according to an embodiment of the present invention.
Figure 2:
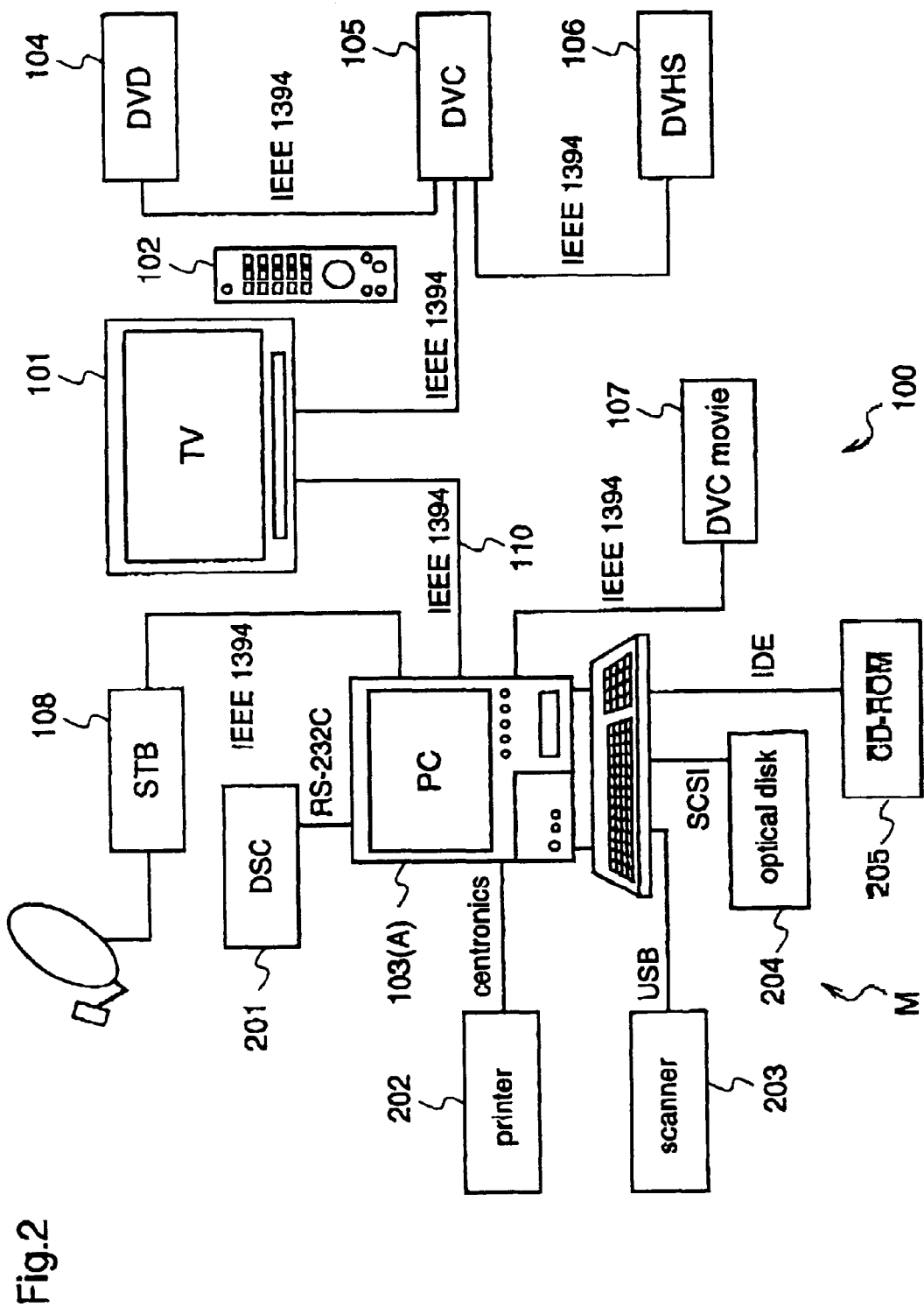
FIG. 2 is a block diagram illustrating a virtual AV network constructed by the virtual AV network construction, apparatus according to the embodiment of the present invention.

The virtual AV network according to the present invention can be said "a virtual AV network" which can give an appearance that an interface of respective peripheral devices M has a compatibility with IEEE1394 or that respective peripheral devices M uses IEEE1394, when the peripheral device M employing an interface having no compatibility with IEEE1394 is connected to a node which is connected to the AV network 100 employing IEEE1394 for an interface as shown in FIG. 2. In other words, a AV network which employs IEEE1394 as a single interface is virtually constructed.

While the interface employed by the virtual AV network is described as IEEE1394 in the following, it is not necessarily restricted thereto. Further, it is described that the above-described node is the PC 103, and that the virtual AV network construction apparatus A according to the present invention is realized on the PC 103; however, it is not necessarily restricted thereto, as well. Moreover, in the following description, video/sound/information devices are collectively described as "device"; however, not only existing video/sound/information devices such as a printer or a mini disk but also all the devices involved in these fields, which may be developed and appear in the future, are included as this device. In addition, "data or a command" which are received and transmitted between respective devices are collectively described as "information" in the following description. Further, though the peripheral device M indicates a DS 201, a printer 202, a scanner 203, an optical disk 204, and a CD-ROM 205 in FIG. 2, it is not necessarily restricted these to, but all the devices involved in these fields, which will be developed and appear in the future, are also included.

Embodiment 1

Initially, a virtual AV network construction apparatus A according to the present invention will be described as a first embodiment with reference to figures.

The constitution of this virtual AV network construction apparatus A is as follows. That is, the virtual AV network construction apparatus A comprises a 1394 link 10 for connecting lines which employ interfaces of IEEE1394 standard, an information receiving/transmitting means 11 for performing reception/transmission of information from/to the 1394 link 10, a protocol processing means 12 for performing routing so as to decide receiving/transmitting destination of information inputted by the information receiving/transmitting means 11, a virtual device function processing means 20 which functions as a so-called sub-unit, an integration management means 30 for activating or terminating the virtual device function processing means 20, an operating system (hereinafter, described as "OS") 40 for activating a PC 103, and a PC device driver 50 for activating peripheral devices connected to the PC 103.

Further, the virtual device function processing means 20 is provided with a data format conversion means 21 for converting a format of data included in the received/transmitted information into a format of the interface of the transmitting destination, and a command translating means 22 for translating a command included in the received/transmitted information to a format of the interface of the transmitting destination.

Moreover, the integration management means 30 is provided with an information path management means 32 for performing reception/transmission of information from/to the virtual device function processing means 20, and a unit destinated processing means 31 for deciding a target virtual device function processing means 20 that the reception/transmission of information is performed, and executing the reception/transmission of information.

Further, the PC device driver 50 is provided with a PC information receiving/transmitting means 52 for performing reception/transmission of information from/to the peripheral device M connected to the PC 103, Ethernet, or the like, and a transmission protocol processing means 51 for processing transmission protocol for reception/transmission of information between the PC information receiving/transmitting means 52 and the OS 40.

In addition, there exist one or more virtual device function processing means 20 and PC device driver 50 in the virtual AV network construction apparatus A. Further, while the virtual AV network construction apparatus A is realized as a form of the PC 103 here, it is not necessarily restricted to the PC 103, but, for example, an apparatus having the function corresponding to the above-described respective parts is also possible.

With respect to respective component parts of the so-constituted virtual AV network construction apparatus A, a brief description will be given with reference to figures.

The 1394 link 10 is a part connected to the AV network which employs IEEE1394 as the interface as shown in figure 2. From this part, information written by the format of IEEE1394 is inputted or outputted to the virtual AV network construction apparatus A.

The information receiving/transmitting means 11 receives and transmits the information written by the format of IEEE1394 with the 1394 link 10. Further, data which is including the information here may be isochronous data or asynchronous data.

The protocol processing means 12 performs routing of the information written in the format of IEEE1394 with the information receiving/transmitting means 11. Concretely, the protocol processing means 12 judges to which virtual device function processing means 20 the information inputted from the information receiving/transmitting means 11 is transmitted, and transmits the judgement result to the integration management means 30.

Further, when the protocol processing means 12 has the information inputted from the virtual device function processing means 20, the protocol processing means 12 initially inquires the integration management means 30 from which virtual device function processing means 20 the information is to be received, following its instruction, establishes its connection with the necessary virtual device function processing means 20 for performing routing, and receives the information from the virtual device function processing means 20.

The virtual device function processing means 20 is a part which operates as a so-called sub-unit. When transmitting the instruction to the corresponding peripheral device M, the virtual device function processing means 20 transmits the input data written by the format of IEEE1394 into a service called system-call, which service the OS 40 provides for controlling the corresponding peripheral device M, by the data format conversion means 21 therein, and outputs the same.

Similarly, the input command written by the format of the IEEE1394 is translated into the format which the peripheral device M utilizes by the command translating means 22, and the translated format is outputted to the OS 40.

On the contrary, when information is transmitted from the peripheral device M through the OS 40, in a reverse procedure of the above-described case, the information is converted into the format of IEEE1394 standard and outputted to the protocol processing means 12.

The integration management means 30 selects which virtual device function processing means 20 used in accordance with the input from the protocol processing means 12, and outputs the instruction for activating the selected virtual device function processing means 20. Further, according to the input from the virtual device function processing means 20, the integration management means 30 instructs the protocol processing means 12 to establish a connection with the virtual device function processing means 20.

Moreover, it is also conceivable that the integration management means 30 acquires peripheral device construction information from the peripheral device construction information 41 which is held by the OS 40, and utilizes the same.

In addition, it is also conceivable that when some peripheral device M is connected to the PC 103, the virtual device function processing means 20 corresponding to this newly connected peripheral device M is automatically activated, while when some peripheral device M is disconnected from the PC 103, the virtual device function processing means 20 corresponding to this disconnected peripheral device M is automatically terminated.

In other words, when a peripheral device M is newly connected to the PC 103, the OS 40 automatically detects the newly connected peripheral device M, and acquires its result as the peripheral device construction information 41. Then, it is conceivable to construct such that when the OS 40 acquires this new information, the integration management means 30 automatically acquires the information, and activates the virtual device function processing means 20 corresponding to the newly connected peripheral device M.

On the other hand, in case of disconnecting the peripheral device M, which was connected to the PC 103, since this disconnection information is similarly transmitted to the integration management means 30, it can be constructed so that the integration management means 30 terminates the virtual device function processing means 20.

With this constitution, it is constructed such that when a new peripheral device M is connected to the PC 103, the virtual device function processing means 20 corresponding to the new peripheral device M is automatically activated, and when the peripheral device M disconnected from the PC 103, the virtual device function processing means 20 corresponding to the disconnected peripheral device M is automatically terminated. Therefore, there is no need for operation for activation and confirmation for termination respectively, thereby enhancing the operationality.

Further, the integration management means 30 is preferably provided with the unit destinated processing means 31 for selecting the virtual device function processing means 20 which has a function of the corresponding peripheral device M as a sub-unit, in accordance with the information inputted from the protocol processing means 12 or the OS 40, thereby enabling smooth reception/transmission of information.

In addition, the integration management means 30 is preferably provided with the information path management means 32 for managing path of the information to receive/transmit to the virtual device function processing means 20, which was selected by the unit destinated processing unit 31, thereby enabling easy management of the information transmission between the virtual device function processing means 20

According to the inputted information, the OS 40 outputs an instruction to the PC device driver 50 or the virtual device function processing means 20 for controlling the operation of the PC 103. On the contrary, the OS 40 also transmits the instruction provided from the PC device driver 50 to the virtual device function processing means 20. Further, the OS 40 may control all of the peripheral device M connected to the PC 103, the integration management means 30, and the virtual device function processing means 20, or a part of them.

The PC device driver 50 controls the operation of the peripheral device M connected to the PC 103 in accordance with the instruction of the OS 40. Further, the PC device driver 50 transmits the instruction from the peripheral device M connected to the PC 103 to the OS 40. The interface employed at this time is one which respective peripheral devices M is used for.

Moreover, if the PC device driver 50 is provided with the transmission protocol processing means 51 and the PC information receiving/transmitting means 52, information inputted from the OS 40 to the PC device driver 50 is initially subjected to the control processing of interface-independent devices in the transmission protocol processing means 51, and subsequently to the control processing of the physical interface in the PC information receiving/transmitting means 52, therefore the information flow between them becomes considerably smooth.

Next, the information flow in the so-constituted virtual AV network construction apparatus A will be described as a first case.

First, a case where an instruction is given from a device employing IEEE1394 to the peripheral device M connected to the PC 103, for example, the case where the instruction is transmitted from the DVC 105, which employs IEEE1394, to the printer 202 connected to the PC 103, which employs Centronics which is incompatible with IEEE1394, is described.

Information written in accordance with IEEE1394, which is transmitted from a device employing IEEE1394, i.e., the DVC 105, is inputted from the 1394 link 10 into the protocol processing means 12 through the information receiving/transmitting means 11.

At this point, the protocol processing means 12 judges to which virtual device function processing means 20 the inputted information is transmitted, and transmits the judgement result to the integration management means 30. For example, in case of transmitting the instruction from the DVC 105 to the printer 202, the information is to be transmitted to the virtual device function processing means 20 which has a sub-unit of the printer 202, and therefore, the protocol processing means 12 issues the instruction to the integration management means 30 for activating the virtual device function processing means 20 which has the sub-unit of the printer 202, so as to establish a connection with the virtual device function processing means 20 for performing routing.

The integration management means 30, in accordance with the instruction content inputted from the protocol processing means 12, activates the target virtual device function processing means 20 to which information is transmitted by the unit destinated processing means 31, and establishes a connection between the target virtual device function processing means 20 and the protocol processing means 12. Then, the protocol processing means 12 transmits the information to the virtual device function processing means 20.

In case of an instruction from the DVC 105 to the printer 202, the integration management means 30 activates the virtual device function processing means 20 which has the sub-unit of the printer 202, and issues the instruction to connect the virtual device function processing means 20 with the protocol processing means 12.

In the virtual device function processing means 20, the data format conversion means 21 converts data included in the inputted information written by the format of IEEE1394 into the format employed by the peripheral device M. Similarly, the command included in the information is converted into the format which the peripheral device M is available by the command translating means 22. Then, the converted data or the translated command is transmitted to the OS 40.

In this example, the information which is written by the format of IEEE1394 which the DVC 105 employs is converted or translated into the information which can be transmitted by Centronics which the printer 202 employs, by the data format conversion means 21 or the command translating means 22. In accordance with the inputted information, the OS 40 performs the control of the peripheral device M connected to the PC 103 by providing the instruction to the PC device driver 50. Therefore, the OS 40 selects the PC device driver 50 corresponding to the peripheral device M, and transmits the instruction to the transmission protocol processing means 51 of the selected PC device driver 50. Then, the transmission protocol processing means 51 transmits the information through the PC information receiving/transmitting means 52 to the peripheral device M which is connected further away.

In case of this example, so as to control the printer 202 connected to the PC 103, the OS 40 selects the PC device driver 50 corresponding to the printer 202, and transmits the information to the transmission protocol processing means 51 of the selected PC device driver 50. Then, an instruction is provided from the transmission protocol processing means 51 to the printer 202 through the PC information receiving/transmitting means 52, and the operation of the printer 202 is controlled.

Thus, it is possible to provide an instruction from a device employing IEEE1394 to the peripheral device M being incompatible with IEEE1394.

Next, the information flow in case of transmitting an instruction from the peripheral device M connected to the PC 103 to a device which employs IEEE1394 is described as a second case. Here, the information is to be transmitted to the TV 101 connected to the AV network 100 employing IEEE1394 from the DSC 201 connected to the PC 103

Initially, information is transmitted to the PC device driver 50 from the peripheral device M connected to the PC 103. The PC device driver 50 transmits the inputted information to the OS 40 through the transmission protocol processing means 51.

The OS 40 transmits this information to the virtual device function processing means 20, where, at this point, the data format conversion means 21 converts the data included in the information which is written by the format which the peripheral device M employs into the format of IEEE1394, similarly the command translating means 22 converts the command included in the information into the format of IEEE1394.

In this case, the information provided from the DSC 201 is written in accordance with the interface employed by the DSC, i.e., RS-232C. Further, the operating virtual device function processing means 20 has a sub-unit of the DSC 201.

Subsequently, in accordance with the input from the OS 40, the virtual device function processing means 20 transmits information about the transmitting destination of the information, i.e., the TV 101 here, to the unit destinated processing means 31 of the integration management means 30. Then, the integration management means 30 transmits this information to the protocol processing means 12, and establishes a connection between the protocol processing means 12 and the virtual device function processing means 20.

When the protocol processing means 12 establishes the connection to the virtual device function processing means 20, the protocol processing means 12 receives the information from the virtual device function processing means 20, and transmits the information to the information receiving/transmitting means 11. Then, the information receiving/transmitting means 11 transmits this information to the AV network which employs IEEE1394, i.e., the TV 101 in this case, through the 1394 link 10.

Thus, information is transmitted from the peripheral device M connected to the PC 103 to the AV network employing IEEE1394.

Moreover, since reception/transmission of data or command is also possible between the peripheral device M connected to the PC 103 in this virtual AV network construction apparatus A, the information flow in this case is described next as a third case. A case where information is to be transmitted from the DSC 201 which is connected to the PC 103, to the printer 202 which is connected to the same PC 103, is described here.

Initially, the information flow from the DSC 201 to the virtual device function processing means 20 is the same as that in the above-described second case. Here, the virtual device function processing means 20 which has a sub-unit of the DSC 201 is operating. In this case, information written in accordance with RS-232C standard which the DSC 201 employs, is received/transmitted until this stage.

Subsequently, the virtual device function processing means 20 which has the sub-unit of the DSC 201 transmits to the unit destinated processing means 31 of the integration management means 30 that the inputted information is to be transmitted to the peripheral device M connected to the same PC 103, i.e., the printer 202 in this case. Then, the integration management means 30 activates the virtual device function processing means 20 which has the sub-unit of the peripheral device M as the transmitting destination of the information, i.e., the printer 202 in this case, by the unit destinated processing means 31, subsequently establishes a connection between these virtual device function processing means 20, i.e., between the virtual device function processing means 20 which has the sub-unit of the DSC 201 and the virtual device function processing means 20 which has the sub-unit of the printer 202, by the information path management means 32, and performs reception/transmission of the information. At this stage, the information from the DSC 201, which was written in accordance with RS-232C, is converted or translated into the form that can be used with Centronics which the printer 202 employs, by the data format conversion means 21 or the command translating means 22.

The virtual device function processing means 20, i.e., the one which has the sub-unit of the printer 202 here, that received the information from the information path management means 32 of the integration management means 30 processes the received information and controls the peripheral device M connected to the PC 103, i.e., the printer 202 here, as described in the above-described first case.

Further, it goes without saying that reception/transmission of information between these peripheral device M connected to the PC 103 can be controlled by other devices connected to the AV network than the PC 103 such as the TV 101.

Figure 3:
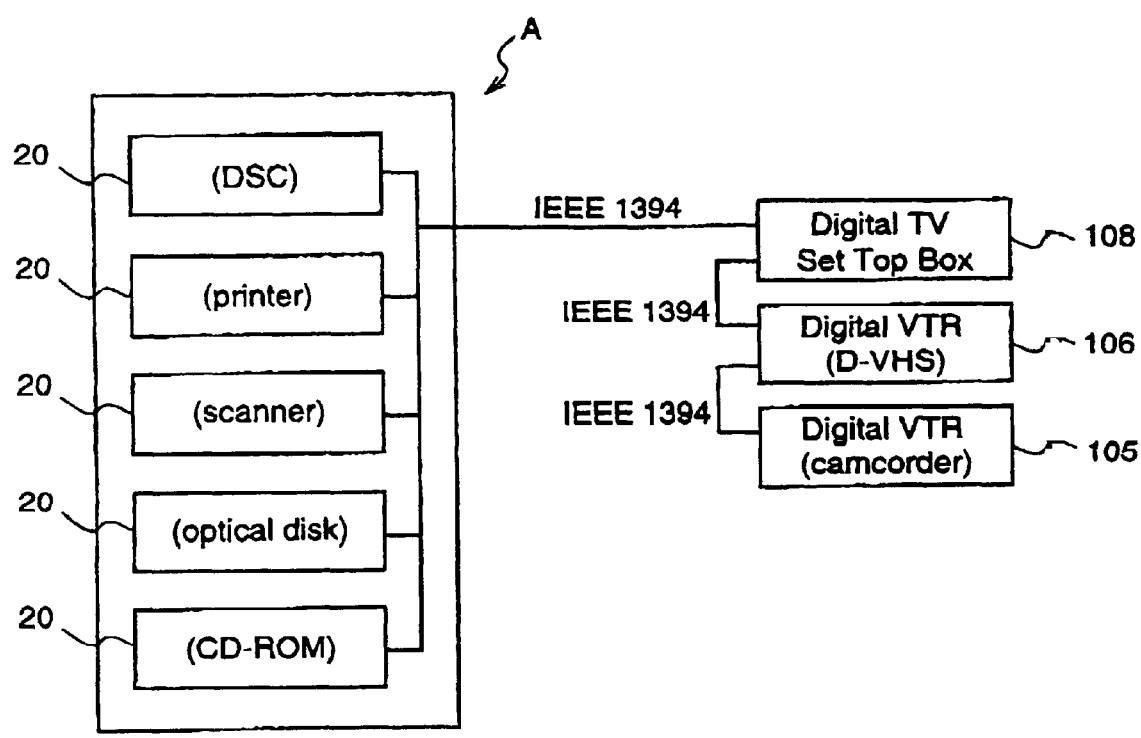
FIG. 3 is a diagram showing an image of the virtual AV network constructed by the virtual AV network construction apparatus according to the embodiment of the present invention.
Figure 4:
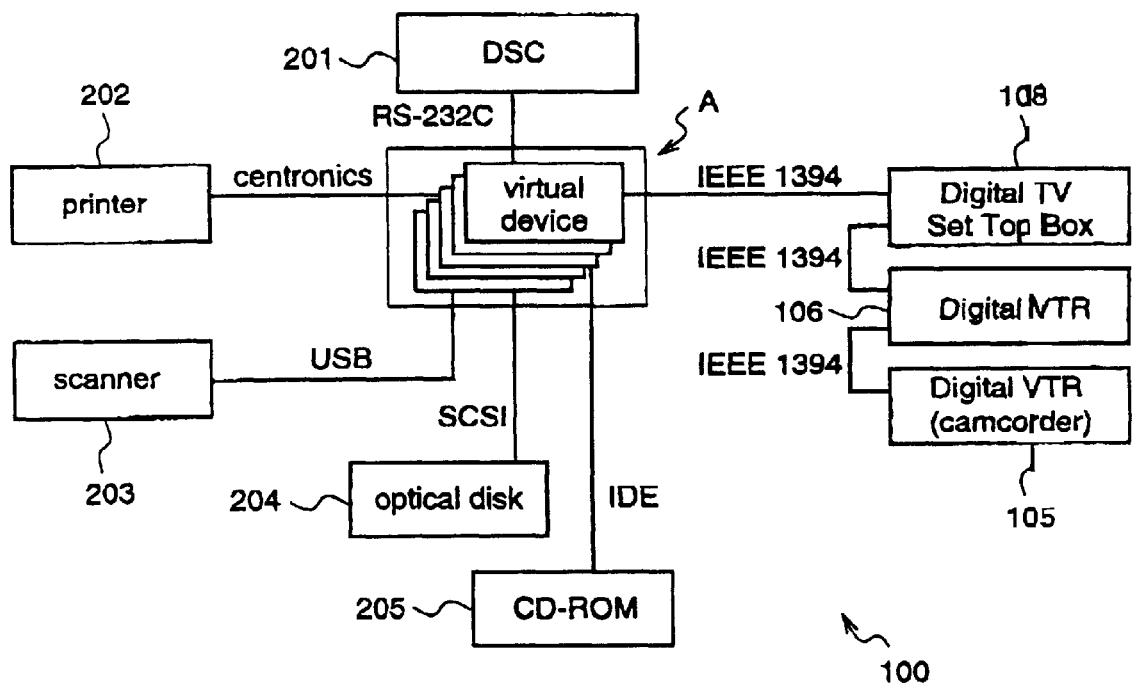
FIG. 4 is a diagram showing the image of the virtual AV network constructed by the virtual. AV network construction apparatus according to the embodiment of the present invention.

In this way, in the virtual AV network constructed by the virtual AV network construction apparatus A of the present invention, all devices behave as if they followed the unified interface, i.e., IEEE1394 in this case, as in the images described in FIGS. 3 and 4. In other words, all devices is operated by a single interface, whereby it is convenient that there is no need for changing connections. Further, it is also convenient that already existing equipment which does not employ IEEE1394 can also be used as a component part of the AV network.

In addition, it is also conceivable that in case of connecting peripheral devices to the PC 103 as the node of the AV network which employs IEEE1394, which is constructed as shown in FIG. 2, for instance, information on the peripheral devices connected to the PC 103 is to be displayed on a screen of the TV 101, for example, by the form of GUI or the like, though it is not described in a figure.

Further, the description about the virtual AV network construction apparatus A has been given in this embodiment; however, obtaining the above-described effects, it can also be considered as a method which enables constructing the virtual AV network. That is, it can also be regarded as a virtual AV network construction method in which means or steps that function in the same way as respective component parts of the virtual AV network construction apparatus A are provided.

In addition, by writing a program concerning the virtual AV network construction method on a recording medium, it is also possible to realize the virtual AV network as described in this embodiment employing the PC 103 for example.

Applicability in Industry

As described above, according to the network control system of the present invention, with a simple constitution, high-capacity data such as icon data is effectively transmitted speedily and reliably, as well as a controller can easily judge what a target transmits even when the target transfers data spontaneously, and moreover, a controller, a target, and a consumer for the network control system are considerably available for constructing above-described network control system.

What is claimed is:

1. A virtual AV network construction apparatus for constructing a virtual AV network which provides an appearance that an AV network and at least one peripheral device that is connected to a node of the AV network, which is constructed by a plurality of devices being connected via data reception/transmission lines, use a single, common interface when the at least one peripheral device has a different interface than the interface that is employed by the AV network by performing processing as if the interface of each of the at least one peripheral device is the same as the interface employed by the AV network, said apparatus comprising:

virtual device function processing means for performing reception/transmission of data or a command between the devices on the AV network and the at least one peripheral device connected to the node by performing control processing mutually between the interface of the at least one peripheral device and the interface of the AV network, wherein each of the at least one peripheral device is provided with a corresponding one of said virtual device function processing means, respectively; and integration management means for activating or terminating said virtual device function processing means corresponding to each of the at least one peripheral device based on peripheral device construction information as construction information for each of the at least one peripheral device, respectively;

wherein said virtual device function processing means comprises a command translating means for translating a command into a format which is employed by at least one of the plurality of devices on the AV network to which the command was directed, and for translating a command into a format which is employed by the at least one peripheral device to which the command was directed;

wherein said command translating means of said virtual device function processing means corresponding to the at least one peripheral device to which the command was directed receives the command transmitted from at least one of the plurality of devices on the AV network and translates the transmitted command, and said virtual processing means corresponding to the at least one peripheral device to which the command was directed transmits the command to the at least one peripheral device to which the command was directed so as to enable the at least one of the plurality of devices on the AV network which transmitted the command to perform control of the at least one peripheral device to which the command was directed;

wherein said command translating means of said virtual device function processing means corresponding to one of the at least one peripheral device which transmitted a command for at least one of the devices on the AV network receives the command transmitted from the one of the at least one peripheral device and translates the transmitted command, and said virtual device function processing means corresponding to the one of the at least one peripheral device which transmitted the command transmits the command to the at least one of the devices to which the command was directed so as to enable the at least one peripheral device which transmitted the command to perform control of the at least one of the devices to which the command was directed; and wherein the plurality of devices on the AV network and the at least one peripheral device connected to the node are operable to deal with at least one of video data, sound data and information data.

2. The virtual AV network construction apparatus according to claim 1, wherein said integration management means automatically performs activation of said virtual device function processing means corresponding to the at least one peripheral device when the at least one peripheral device is inserted in the node, and automatically performs termination of said virtual device function processing means corresponding to the at least one peripheral device connected to the node when the at least one peripheral device connected to the node is ejected from the node.

3. The virtual AV network construction apparatus according to claim 1, wherein said virtual device function processing means includes sub-unit function processing means for performing a function of the at least one peripheral device, and said integration management means includes unit destination processing means for giving an appearance as if a function of the at least one peripheral device is present inside the node by said integration management means performing reception/transmission of data or a command from the AV network to said sub-unit function processing means of said virtual device function processing means corresponding to the at least one peripheral device.

4. The virtual AV network construction apparatus according to claim 1, wherein said integration management means performs, between a plurality of peripheral devices, reception/transmission of data or a command from/to said virtual device function processing means corresponding to the plurality of peripheral devices, respectively, when an instruction to perform reception/transmission of the data or the command between the plurality of peripheral devices is transmitted by at least one of the devices on the AV network when the plurality of peripheral devices are connected to the node.

5. The virtual AV network construction apparatus according to claim 1, wherein said virtual device function processing means includes data format conversion means for selecting an operation to convert a format of the interface employed by the at least one peripheral device into a format of the interface employed by the AV network based on a data format used by the at least one peripheral device connected to the node.

6. The virtual AV network construction apparatus according to claim 1, wherein the format employed by the AV network is the IEEE 1394 standard.

7. The virtual AV network construction apparatus according to claim 1, wherein a computer is used as the node, and said virtual device function processing means and said integration management means are controlled by employing an operating system of the computer.

8. The virtual AV network construction apparatus according to claim 7, wherein the peripheral device construction information is obtained from peripheral device construction information held by the operating system.

9. The virtual AV network construction apparatus according to claim 7, wherein the control of the at least one peripheral device locally connected to the computer is performed by a device driver software of the operating system, and said virtual device function processing means corresponding to the at least one peripheral device performing the control processing performs reception/transmission of data or a command from/to the device driver software corresponding to the at least one peripheral device performing the control processing.

10. A virtual AV network construction method for constructing a virtual AV network which provides an appearance that an AV network and at least one peripheral device that is connected to a node of the AV network, which is constructed by a plurality of devices being connected via data reception/transmission lines, use a single, common interface when the at least one peripheral device has a different interface than the interface that is employed by the AV network by performing processing as if the interface of each of the at least one peripheral device is the same as the interface employed by the AV network, wherein the plurality of devices on the AV network and the at least one peripheral device connected to the node are operable to deal with at least one of video data, sound data and information data, said network comprising:

performing reception/transmission of data or a command between the devices on the AV network and the at least one peripheral device connected to the node by performing control processing mutually between the interface of each of the at least one peripheral device and the interface of the AV network;

an integration management operation of activating or terminating said performing of the reception/transmission of the data or the command from/to each of the at least one peripheral device based on peripheral device construction information as construction information for each of the at least one peripheral device, respectively;

wherein said performing of the reception/transmission of the data or the command includes translating a command into a format which is employed by at least one of the plurality of the devices on the AV network to which the command was directed, and translating a command into a format which is employed by the at least one peripheral device to which the command was directed, controlling at least one of the plurality of devices on the AV network which transmitted a command to the at least one of the peripheral device to which the command was directed to perform control of the at least one peripheral device to which the command was directed by said translating of the command receiving and translating the command transmitted from the at least one of the plurality of devices on the AV network and by transmitting the translated command to the at least one peripheral device to which the command was directed, and controlling at least one peripheral device which transmitted a command for at least one of the plurality of devices on the AV network to which the command was directed to perform control of the at least one of the plurality of devices on the AV network to which the command was directed by said translating of the command receiving and translating a command transmitted from the one of the at least one peripheral device and by transmitting the translated command to the at least one of the plurality of devices to which the command was directed.

11. The virtual AV network construction method according to claim 10, wherein said integration management operation automatically activates said performing of the reception/transmission of the data or the command when the at least one peripheral device is inserted in the node, and automatically terminates said performing of the reception/transmission of the data or the command when the at least one peripheral device connected to the node is ejected from the node.

12. The virtual AV network construction method according to claim 10, wherein said performing of the reception/transmission of the data or the command includes a sub-unit function processing operation which operates as a function of the at least one peripheral device, and
    said integration management operation includes a unit function processing destination processing operation for giving an appearance as if a function of the at least one peripheral device is present inside the node by said integration management operation performing reception/transmission of data or a command from the AV network to said sub-unit function processing operation.

13. The virtual AV network construction method according to claim 10, wherein said performing of the reception/transmission of the data or the command is performed for each of the at least one peripheral device, respectively, and
    said integration management operation performs, between a plurality of peripheral devices, reception/transmission of data or commands from/to each of said at least one of said performing of the reception/transmission of the data or the command corresponding to each of the plurality of peripheral devices, respectively, when an instruction to perform reception/transmission of the data or the command between the plurality of peripheral devices is transmitted by at least one of the devices on the AV network when the plurality of peripheral devices are connected to the node.

14. The virtual AV network construction method according to claim 10, wherein said performing of the reception/transmission of the data or the command includes selecting an operation to convert a format of the interface employed by the at least one peripheral device into a format of the interface employed by the AV network based on a data format used by the peripheral device connected to the node.

15. The virtual AV network construction method according to claim 10, wherein the format employed by the AV network is the IEEE 1394 standard.

16. The virtual AV network construction method according to claim 10, wherein a computer is used as the node, and said performing of the reception/transmission of the data or the command and said integration management operation are controlled by employing an operating system of the computer.

17. The virtual AV network construction method according to claim 16, wherein the peripheral device construction information is obtained from peripheral device construction information held by the operating system.

18. The virtual AV network construction method according to claim 16, wherein the control of the at least one peripheral device locally connected to the computer is performed by a device driver software of the operating system, and said performing of the reception/transmission of the data or the command performs reception/transmission of the data or the command from/to the device driver software corresponding to the at least one peripheral device performing the control processing.

19. A recording medium containing a program for executing a virtual AV network construction method for constructing a virtual AV network which provides an appearance that an AV network and at least one peripheral device that is connected to a node of the AV network, which is constructed by a plurality of devices being connected via data reception/transmission lines, use a single, common interface when the at least one peripheral device has a different interface than the interface that is employed by the AV network by performing processing as if the interface of each of the at least one peripheral device is the same as the interface employed by the AV network, wherein the plurality of devices on the AV network and the at least one peripheral device connected to the node are operable to deal with at least one of video data, sound data and information data, said network comprising:
    performing reception/transmission of data or a command between the devices on the AV network and the at least one peripheral device connected to the node by performing control processing mutually between the interface of each of the at least one peripheral device and the interface of the AV network;
    an integration management operation of activating or terminating said performing of the reception/transmission of the data or the command from/to each of the at least one peripheral device based on peripheral device construction information as construction information for each of the at least one peripheral device, respectively;
    wherein said performing of the reception/transmission of the data or the command includes
        translating a command into a format which is employed by at least one of the plurality of the devices on the AV network to which the command was directed, and translating a command into a format which is employed by the at least one peripheral device to which the command was directed,
        controlling at least one of the plurality of devices on the AV network which transmitted a command to the at least one of the peripheral device to which the command was directed to perform control of the at least one peripheral device to which the command was directed by said translating of the command receiving and translating the command transmitted from the at least one of the plurality of devices on the AV network and by transmitting the translated command to the at least one peripheral device to which the command was directed, and
        controlling at least one peripheral device which transmitted a command for at least one of the plurality of devices on the AV network to which the command was directed to perform control of the at least one of the plurality of devices on the AV
    network to which the command was directed by said translating of the command
    receiving and translating a command transmitted from the one of the at least one peripheral device and by transmitting the translated command to the at least one of the plurality of devices to which the command was directed.

20. The recording medium containing a program for executing the virtual AV construction method according to claim 19, wherein said integration management operation automatically activates said performing of the reception/transmission of the data or the command when the at least one peripheral device is inserted in the node, and automatically terminates said performing of the reception/transmission of the data or the command when the at least one peripheral device connected to the node is ejected from the node.

21. The recording medium containing a program for executing the virtual AV construction method according to claim 19, wherein said performing of the reception/transmission of the data or the command includes a sub-unit friction processing operation which operates as a function of the at least one peripheral device, and said integration management operation includes a unit function processing destination processing operation for giving an appearance as if a function of the at least one peripheral device is present inside the node by said integration management operation performing reception/transmission of data or a command from the AV network to said sub-unit function processing operation.

22. The recording medium containing a program for executing the virtual AV construction method according to claim 19, wherein said performing of the reception/transmission of the data or the command is performed for each of the at least one peripheral device, respectively, and said integration management operation performs, between a plurality of peripheral devices, reception/transmission of data or commands from/to each of said at least one of said performing of the reception/transmission of the data or the command corresponding to each of the plurality of peripheral devices, respectively, when an instruction to perform reception/transmission of the data or the command between the plurality of peripheral devices is transmitted by at least one of the devices on the AV network when the plurality of peripheral devices are connected to the node.

23. The recording medium containing a program for executing the virtual AV construction method according to claim 19, wherein said performing of the reception/transmission of the data or the command includes selecting an operation to convert a format of the interface employed by the at least one peripheral device into a format of the interface employed by the AV network based on a data format used by the peripheral device connected to the node.

24. The recording medium containing a program for executing the virtual AV construction method according to claim 19, wherein the format employed by the AV network is the IEEE 1394 standard.

25. The recording medium containing a program for executing the virtual AV construction method according to claim 19, wherein a computer is used as the node, and said performing of the reception/transmission of the data or the command and said integration management operation are controlled by employing an operating system of the computer.

26. The recording medium containing a program for executing the virtual AV construction method according to claim 25, wherein the peripheral device construction information is obtained from peripheral device construction information held by the operating system.

27. The recording medium containing a program for executing the virtual AV construction method according to claim 25, wherein the control of the at least one peripheral device locally connected to the computer is performed by a device driver software of the operating system, and said performing of the reception/transmission of the data or the command performs reception/transmission of the data or the command from/to the device driver software corresponding to the at least one peripheral device performing the control processing.

28. A virtual AV network construction apparatus operable to construct a virtual AV network which provides an appearance that an AV network and at least one peripheral device that is connected to a node of the AV network, which is constructed by a plurality of devices being connected via data reception/transmission lines, use a single, common interface when the at least one peripheral device has a different interface than the interface that is employed by the AV network by performing processing as if the interface of each of the at least one peripheral device is the same as the interface employed by the AV network, said apparatus comprising:

at least one virtual device function processing unit operable to perform reception/transmission of data or a command between the devices on the AV network and the at least one peripheral device connected to the node by performing control processing mutually between the interface of the at least one peripheral device and the interface of the AV network, wherein each of the at least one peripheral device is provided with a corresponding one of said at least one virtual device function processing unit, respectively; and an integration management unit operable to activate or terminate each of said at least one virtual device function processing unit corresponding to each of the at least one peripheral device, respectively, based on peripheral device construction information as construction information for each of the at least one peripheral device, respectively;

wherein each of said at least one virtual device function processing unit comprises a command translating unit operable to translate a command into a format which is employed by at least one of the plurality of devices on the AV network to which the command was directed, and to translate a command into a format which is employed by the at least one peripheral device to which the command was directed;

wherein said command translating unit of said virtual device function processing unit corresponding to the at least one peripheral device to which the command was directed is operable to receive the command transmitted from at least one of the plurality of devices on the AV network and to translate the transmitted command, and said virtual device function processing unit corresponding to the at least one peripheral device to which the command was directed is operable to transmit the command to the at least one peripheral device to which the command was directed so as to enable the at least one of the plurality of devices on the AV network which transmitted the command to perform control of the at least one peripheral device to which the command was directed;

wherein said command translating unit of said virtual device function processing unit corresponding to one of the at least one peripheral device which transmitted a command for at least one of the devices on the AV network is operable to translate the transmitted command to the at least one of the devices to which the command was directed, and said virtual device function processing unit corresponding to the one of the at least one peripheral device which transmitted the command is operable to transmit the command to the at least one of the devices to which the command was directed so as to enable the one of the at least one peripheral device which transmitted the command to perform control of the at least one of the devices to which the command was directed; and wherein the plurality of devices on the AV network and the at least one peripheral device connected to the node are operable to deal with at least one of video data, sound data and information data.

29. The virtual AV network construction apparatus according to claim 28, wherein said integration management unit automatically performs activation of said at least one virtual device function processing unit corresponding to the at least one peripheral device when the at least one peripheral device is inserted in the node, and automatically performs termination of said at least one virtual device function processing unit corresponding to the at least one peripheral device connected to the node when the at least one peripheral device connected to the node is ejected from the node.

30. The virtual AV network construction apparatus according to claim 29, wherein each of said at least one virtual device function processing unit includes a sub-unit function processing unit which is operable to perform a function of the at least one peripheral device, respectively, and said integration management unit includes a destination processing unit for giving an appearance as if a function of the at least one peripheral device is present inside the node by said integration management unit performing reception/transmission of data or a command from the AV network to said sub-unit function processing unit of said at least one virtual device function processing unit corresponding to the at least one peripheral device.

31. The virtual AV network construction apparatus according to claim 29, wherein said integration management unit is operable to perform, between a plurality of peripheral devices, reception/transmission of data or a command from/to said at least one virtual device function processing unit corresponding to the plurality of peripheral devices, respectively, when an instruction to perform reception/transmission of the data or the command between the plurality of peripheral devices is transmitted by at least one of the devices on the AV network when the plurality of peripheral devices are connected to the node.

32. The virtual AV network construction apparatus according to claim 29, wherein each of said at least one virtual device function processing unit includes a data format conversion unit operable to select an operation to convert a format of the interface employed by the at least one peripheral device into a format of the interface employed by the AV network based on a data format used by the at least one peripheral device connected to the node.

33. The virtual AV network construction apparatus according to claim 29, wherein the format employed by the AV network is the IEEE 1394 standard.

34. The virtual AV network construction apparatus according to claim 29, wherein a computer is used as the node, and each of said at least one virtual device function processing unit and said integration management unit are controlled by employing an operating system of the computer.

35. The virtual AV network construction apparatus according to claim 34, wherein the peripheral device construction information is obtained from peripheral device construction information held by the operating system.

36. The virtual AV network construction apparatus according to claim 34, wherein the control of the peripheral device locally connected to the computer is performed by a device driver software of the operating system, and said at least one virtual device function processing unit corresponding to the at least one peripheral device is operable to perform reception/transmission of data or a command from/to the device driver software corresponding to the at least one peripheral device performing the control processing.

* * * * *